United States Patent
Xu et al.

(10) Patent No.: US 10,477,126 B1
(45) Date of Patent: Nov. 12, 2019

(54) DUAL ECLIPSE CIRCUIT FOR REDUCED IMAGE SENSOR SHADING

(71) Applicant: SmartSens Technology (Cayman) Co., Limited., Shanghai (CN)

(72) Inventors: Chen Xu, Shanghai (CN); Yaowu Mo, Shanghai (CN); Zexu Shao, Shanghai (CN); Zhengmin Zhang, Shanghai (CN); Weijian Ma, Shanghai (CN)

(73) Assignee: SmartSens Technology (Cayman) Co., Limited (CN)

( * ) Notice: Subject to any disclaimer, the term of this patent is extended or adjusted under 35 U.S.C. 154(b) by 0 days.

(21) Appl. No.: 16/121,973

(22) Filed: Sep. 5, 2018

(51) Int. Cl.
*H04N 5/365* (2011.01)
*H04N 5/378* (2011.01)
*H04N 5/359* (2011.01)
*H04N 5/353* (2011.01)

(52) U.S. Cl.
CPC ......... *H04N 5/3651* (2013.01); *H04N 5/3598* (2013.01); *H04N 5/378* (2013.01); *H04N 5/3532* (2013.01)

(58) Field of Classification Search
CPC ..... H04N 5/3651; H04N 5/3598; H04N 5/378
See application file for complete search history.

(56) References Cited

U.S. PATENT DOCUMENTS

| | | | |
|---|---|---|---|
| 6,731,335 B1 | 5/2004 | Kim et al. | |
| 7,167,200 B1 | 1/2007 | Phal et al. | |
| 7,573,519 B2 | 8/2009 | Phan et al. | |
| 9,596,423 B1 | 3/2017 | Molgaard | |
| 9,686,485 B2 | 6/2017 | Agranov et al. | |
| 2011/0133057 A1 | 6/2011 | Olsen | |
| 2011/0279720 A1* | 11/2011 | Nakagawa | H04N 5/3745 348/300 |
| 2012/0212657 A1 | 8/2012 | Mo et al. | |
| 2016/0065868 A1 | 3/2016 | Olsen | |

OTHER PUBLICATIONS

Yannick De Wit, Tomas Geurts; Title: A Low Noise Low Power Global Shutter CMOS Pixel Having Capability and Good Shutter Efficiency; Date: Unknown; pp. 1-4; Pub: Belgium.

* cited by examiner

*Primary Examiner* — Nicholas G Giles
(74) *Attorney, Agent, or Firm* — Eric Karich; Karich & Associates

(57) ABSTRACT

A pixel cell and readout circuit includes an anti-eclipse voltage clamp circuit at both the top and bottom of each column line of an array of the pixel cells. The anti-eclipse voltage clamp circuits form a row with each column in the array coupled to an anti-eclipse voltage clamp circuit. The combination of two rows of anti-eclipse voltage clamp circuits helps settle the clamp voltage more rapidly and to compensate for the increased length of the anti-eclipse voltage circuit row as well as the column line resistance due to narrow metal lines and increased numbers of pixels as well as the requirement to operate a sensor at a higher frame rate. More significantly this circuit construction can minimize vertical shading in the resulting image.

5 Claims, 3 Drawing Sheets

DUAL ECLIPSE CIRCUIT FOR REDUCED IMAGE SENSOR SHADING

BACKGROUND OF THE INVENTION

Field of the Invention

This invention relates generally to image sensors, and more particularly to CMOS image sensors. The present invention provides an image sensor array and circuit design to reduce vertical shading when very large pixel arrays are employed. An image sensor comprising the invented circuit design may be incorporated within a digital camera.

Description of Related Art

An image capture device includes an image sensor and an imaging lens. The imaging lens focuses light onto the image sensor to form an image, and the image sensor converts the light into electrical signals. The electric signals are output from the image capture device to other components of a host electronic system. The image capture device and the other components of a host electronic system form an imaging system. Image sensors have become ubiquitous and may be found in a variety of electronic systems, for example a mobile device, a digital camera, a medical device, or a computer.

A typical image sensor comprises a number of light sensitive picture elements ("pixels") arranged in a two-dimensional array. Such an image sensor may be configured to produce a color image by forming a color filter array (CFA) over the pixels. The technology used to manufacture image sensors, and in particular, complementary metal-oxide-semiconductor ("CMOS") image sensors, has continued to advance at great pace. For example, the demands of higher resolution and lower power consumption have encouraged the further miniaturization and integration of these image sensors. However, miniaturization has led to pixel arrays becoming larger and larger in the number of pixels but not much larger in overall area due to the use of narrower interconnect lines and smaller electronic components in the pixels and in the readout and control circuits. The use of narrower column lines for example may contribute to increased column bus resistance which may lead to top to bottom voltage differences and result in effects such as vertical shading in the resultant image. New approaches to image sensor circuit design are required to mitigate such effects.

With the decreased pixel size, the total light absorption depth within the substrate becomes insufficient for some light, especially long-wavelength light. This becomes a particular problem for image sensors using backside illumination (BSI) technology wherein the image light is incident upon the backside of the sensor substrate. In BSI technology the sensor Silicon substrate may be only two microns (micrometers) thick which is adequate to absorb blue light but very inadequate to absorb red light which may require ten microns of thickness to be fully absorbed.

Two of the most common methods for reading off the image signals generated on a sensor chip are the rolling shutter mode and the global shutter mode. The rolling shutter mode involves exposing different lines of the sensor array at different times and reading out those lines in a chosen sequence. The global shutter mode involves exposing each pixel simultaneously and for the same length of time similar to how a mechanical shutter operates on a legacy "snapshot" camera. Prior art digital imaging systems have utilized either rolling shutter or global shutter readout modes. There are advantages however to having an imaging system which is capable of both readout modes wherein the readout mode is selectable by the operator.

Rolling shutter (RS) mode exposes and reads out adjacent rows of the array at different times, that is, each row will start and end its exposure slightly offset in time from its neighbor. The readout of each row follows along each row after the exposure has been completed and transfers the charge from each row into the readout node of the pixel. Although each row is subject to the same exposure time, the row at the top will have ended its exposure a certain time prior to the end of the exposure of the bottom row of the sensor. That time depends on the number of rows and the offset in time between adjacent rows. A potential disadvantage of rolling shutter readout mode is spatial distortion which results from the above. The distortion becomes more apparent in cases where larger objects are moving at a rate that is faster than the readout rate. Another disadvantage is that different regions of the exposed image will not be precisely correlated in time and appear as a distortion in the image. To improve signal to noise in the image signal final readout, specifically to reduce temporal dark noise, a reference readout called correlated double sampling (CDS) is performed prior to the conversion of each pixel charge to an output signal by an amplifier transistor. The amplifier transistor may typically be a transistor in a source-follower (SF) or common drain configuration wherein the pixel employs a voltage mode readout. However, there are advantages to incorporating a common source amplifier wherein the pixel employs a current mode readout. The common source amplifier may be used in large area imagers. The current of the photodiode is amplified and the readout circuits integrate the current on a capacitor to a voltage, which is then converted to the digital domain.

Global shutter (GS) mode exposes all pixels of the array simultaneously. This facilitates the capture of fast moving events, freezing them in time. Before the exposure begins all the pixels are reset (RST) to the same ostensibly dark level by draining all their charge. At the start of the exposure each pixel begins simultaneously to collect charge and is allowed to do so for the duration of the exposure time. At the end of the exposure each pixel transfers charge simultaneously to its readout node. Global shutter mode can be configured to operate in a continuous manner whereby an exposure can proceed while the previous exposure is being readout from the readout storage nodes of each pixel. In this mode the sensor has 100% duty cycle which optimizes time resolution and photon collection efficiency. There is no artifact in the image of the period of transient readout that occurs in rolling shutter mode. Global shutter can be regarded as essential when exact time correlation is required between different regions of the sensor area. Global shutter is also very simple to synchronize with light sources or other devices.

Global shutter mode demands that a pixel contain at least one more transistor or storage component than a pixel using rolling shutter mode. Those extra components are used to store the image charge for readout during the time period following simultaneous exposure. Again in order to improve signal to noise in the image signal a reference readout is required not only to be performed prior to the conversion of each pixel charge to an output signal by an amplifier transistor but also prior to the transfer of the pixel charge to the extra components of the pixel used to store the image charge during readout.

In summary, rolling shutter can deliver the lowest read noise and is useful for very fast streaming of data without synchronization to light sources or peripheral devices. However it carries risk of spatial distortion especially when imaging relatively large, fast moving objects. There is no risk of spatial distortion when using global shutter and when synchronizing to fast switching peripheral devices it is relatively simple and can result in faster frame rates. Flexibility to offer both rolling shutter and global shutter can be very advantageous.

CMOS image sensors are subject to oversaturation when imaging very bright objects. Oversaturation may result in very bright objects appearing dark instead of bright within the picture. This phenomenon is referred to as eclipse and advanced CMOS image sensors employ an anti-eclipse circuit in order to prevent the column line from dropping below a certain floor level that may represent a full bright level. One related effect is top to bottom, vertical, shading which is a gradual increase or decrease among pixel values in a column that changes with the row number of the pixel. Vertical shading may be attributed to a difference in settling error between top and bottom readout paths. This is mainly due to the resistance of the column bus. Larger pixel arrays may also require anti-eclipse circuits, which can be in the form of a row or circuits each circuit coupled to each of the column lines, to become very long and thereby require longer settling times which may also lead to vertical shading. Another contributing factor to vertical shading is DC voltage shading in the array due to a voltage drop along the routing path. DC voltage shading depends on the DC operating point of the source follower in the pixel readout circuitry. Yet another concern is the mismatch between the top and bottom readout channels of the readout circuitry. In some prior art image sensors separate readout circuits are coupled to the top and the bottom of each column in order to address some of these shading concerns.

An opportunity for improvement of image sensors arises when certain components are employed to enhance their ability to adequately image both high lights and dark shadows in a scene while maintaining high image quality, including avoidance of vertical shading. The present invention fulfills these needs and provides further advantages as described in the following summary.

SUMMARY OF THE INVENTION

The present invention teaches certain benefits in construction and use which give rise to the objectives described below.

A pixel cell and readout circuit includes an anti-eclipse voltage clamp circuit at both the top and bottom of each column line of an array of the pixel cells. The anti-eclipse voltage clamp circuits form a row with each column in the array coupled to an anti-eclipse voltage clamp circuit. The combination of two rows of anti-eclipse voltage clamp circuits helps settle the clamp voltage more rapidly and to compensate for the increased length of the anti-eclipse voltage circuit row as well as the column line resistance due to narrow metal lines and increased numbers of pixels as well as the requirement to operate a sensor at a higher frame rate. More significantly this circuit construction can minimize vertical shading in the resulting image. The unique construction of the pixel cell and readout circuit may also obviate the need to include full readout circuits at the top and bottom of each column as has been done in the prior art.

A primary objective of the present invention is to provide an image sensor pixel having advantages not taught by the prior art.

Another objective is to provide a pixel cell that has the ability to adequately image both high lights and dark shadows in a scene while maintaining high image quality.

An additional objective of the present is to provide a pixel cell anti-eclipse circuits that increase the opportunity to use large pixel arrays at high frame rates without pixel oversaturation and with minimized settling time of the anti-eclipse voltage clamp and minimized vertical shading.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

The above-described drawing figures illustrate the invention, an image sensor pixel cell with shading reduction circuit elements. Various embodiments of the image sensor pixel cell are disclosed herein. In the following description, numerous specific details are set forth in order to provide a thorough understanding of the present invention. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects. A substrate may have a front side and a back side. Any fabrication process that is performed from the front side may be referred to as a frontside process while any fabrication process that is performed from the back side may be referred to as a backside process. Structures and devices such as photodiodes and associated transistors may be formed in a front surface of a substrate. A dielectric stack that includes alternating layers of metal routing layers and conductive via layers may be formed on the front surface of a substrate.

Throughout the specification and claims, the following terms take the meanings explicitly associated herein, unless the context clearly dictates otherwise. The terms "coupled" and "connected," which are utilized herein, are defined as follows. The term "connected" is used to describe a direct connection between two circuit elements, for example, by way of a metal line formed in accordance with normal integrated circuit fabrication techniques. In contrast, the term "coupled" is used to describe either a direct connection or an indirect connection between two circuit elements. For example, two coupled elements may be directly coupled by way of a metal line, or indirectly connected by way of an intervening circuit element (e.g., a capacitor, resistor, or by way of the source/drain terminals of a transistor). The term "circuit" means either a single component or a multiplicity of components, either active or passive, that are coupled together to provide a desired function. The term "signal" means at least one current, voltage, or data signal. Should the invention involve a stacked chip arrangement the front sides of two chips may be directly connected since the electrical interconnects on each chip will most commonly be formed on the front sides of each chip or the front side of one chip may be directly connected to the backside of the second which may employ through chip interconnects. When reference is made to certain circuit elements residing within or formed in a substrate this is generally accepted to mean the circuits reside on the front side of the substrate.

Figure 1:
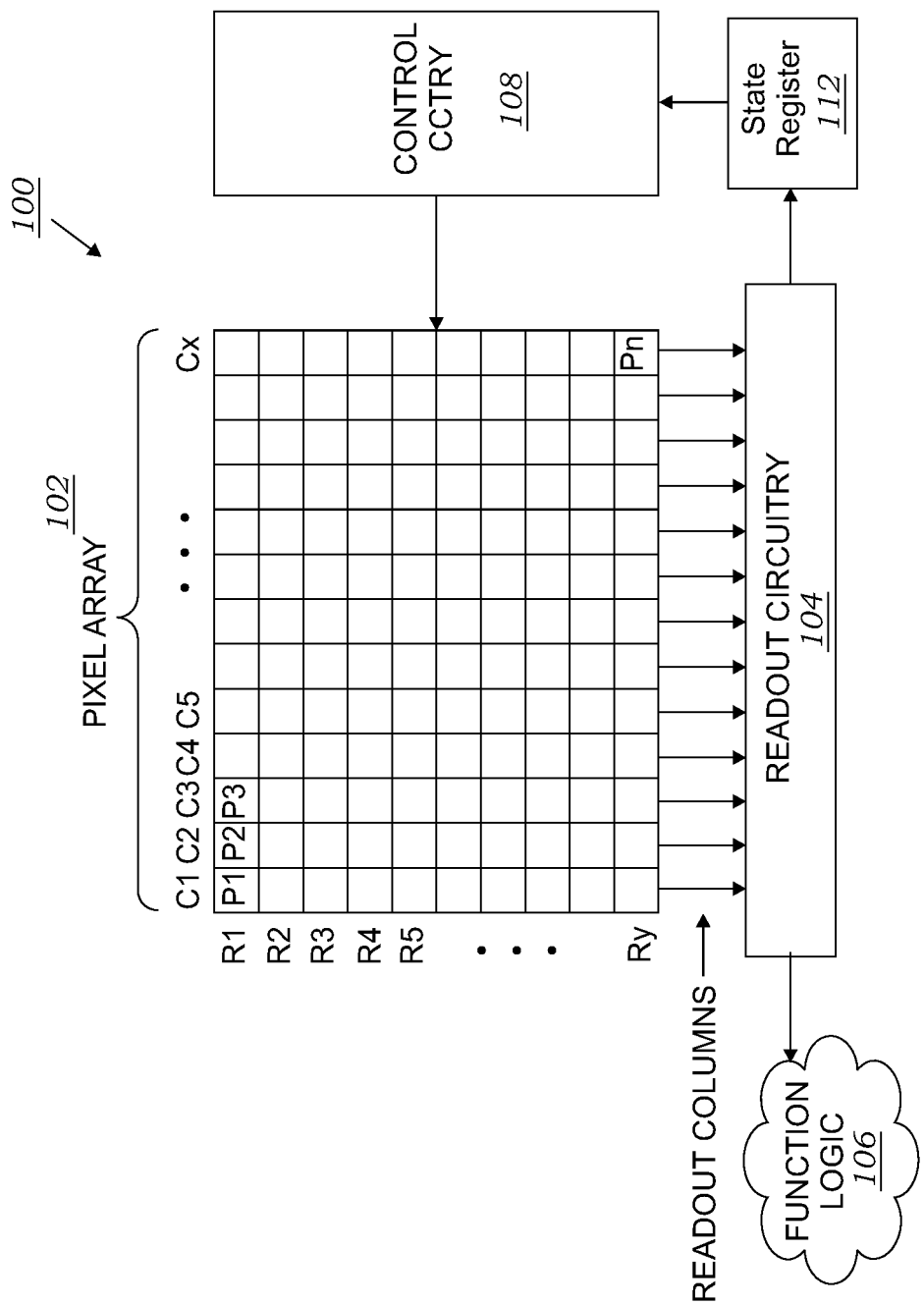
FIG. 1 is a diagram illustrating one example of an imaging system including a pixel array having image sensor pixel cells included in an integrated circuit system according to one embodiment of the present invention.

FIG. 1 is a diagram illustrating one example of an imaging system 100 including an example pixel array 102 having a plurality of image sensor pixels included in an example integrated circuit system with features in accordance with the teachings of the present invention. As shown in the depicted example, imaging system 100 includes pixel array 102 coupled to control circuitry 108 and readout circuitry 104, which is coupled to function logic 106. Control circuitry 108 and readout circuitry 104 are in addition coupled to state register 112. In one example, pixel array 102 is a two-dimensional (2D) array of image sensor pixels (e.g., pixels P1, P2 . . . , Pn). As illustrated, each pixel is arranged into a row (e.g., rows R1 to Ry) and a column (e.g., column C1 to Cx) to acquire image data of a person, place, object, etc., which can then be used to render a 2D image of the person, place, object, etc. In one example, after each pixel has acquired its image data or image charge, the image data is readout by readout circuitry 104 using a readout mode specified by state register 112 and then transferred to function logic 106. In various examples, readout circuitry 104 may include amplification circuitry, analog-to-digital (ADC) conversion circuitry, or otherwise. State register 112 may include a digitally programmed selection system to determine whether readout mode is by rolling shutter or global shutter. Function logic 106 may simply store the image data or even manipulate the image data by applying post image effects (e.g., crop, rotate, remove red eye, adjust brightness, adjust contrast, or otherwise). In one example, readout circuitry 104 may readout a row of image data at a time along readout column lines (illustrated) or may readout the image data using a variety of other techniques (not illustrated), such as a serial readout or a full parallel readout of all pixels simultaneously. In one example, control circuitry 108 is coupled to pixel array 102 to control operational characteristics of pixel array 102. Some aspects of the operation of control circuitry 108 may be determined by settings present in state register 112. For example, control circuitry 108 may generate a shutter signal for controlling image acquisition. In one example, the shutter signal is a global shutter signal for simultaneously enabling all pixels within pixel array 102 to simultaneously capture their respective image data during a single acquisition window. In another example, the shutter signal is a rolling shutter signal such that each row, column, or group of pixels is sequentially enabled during consecutive acquisition windows.

Figure 2:
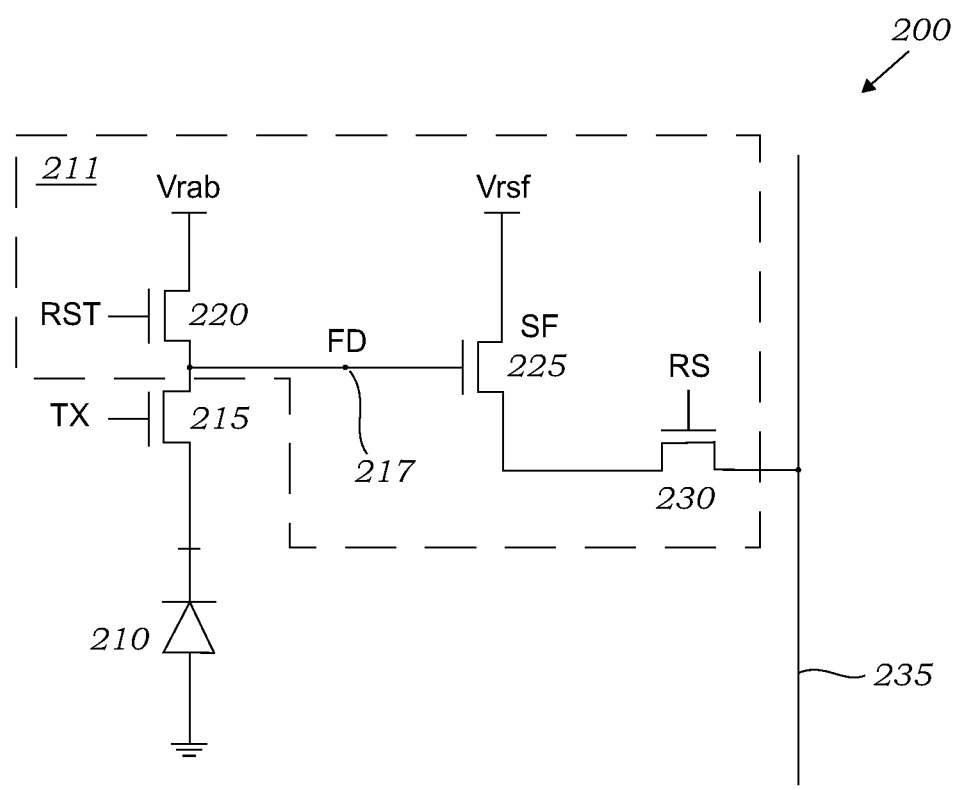
FIG. 2 is an electrical schematic that illustrates one example of an image sensor pixel cell with rolling shutter readout found in the prior art.

FIG. 2 is an electrical schematic that illustrates one example of an image sensor pixel cell 200 with rolling shutter readout found in the prior art. This figure and example pixel are provided to simplify explanation of pixel operation in anticipation of a description of an example of the present invention. Each sensor pixel 200 includes a photodiode 210 (e.g., photosensitive element) and pixel support circuitry 211 as shown. Photodiode 210 may be a "pinned" photodiode as is commonly present in CMOS image sensors. Photodiode 210 may be disposed on a sensor chip of a stacked die system, while pixel support circuitry 211 may be disposed on a separate circuit chip. In one example, pixel support circuitry 211 includes a reset transistor 220, source follower (SF) amplifier transistor 225, and row select transistor 230 on a circuit chip coupled to a transfer transistor 215 and photodiode 210 on a sensor chip of a stacked die system as shown. An amplifier transistor in a source follower configuration is one in which the signal is input on the gate electrode and taken out on the source electrode. In another example, not shown, pixel support circuitry includes row select transistor 230 on a circuit chip coupled to a reset transistor 220, source follower (SF) transistor 225, transfer transistor 215 and photodiode 210 on a sensor chip of a stacked die system. During operation, photosensitive element 210 photo-generates charge in response to incident light during an exposure period. Transfer transistor 215 is coupled to receive a transfer signal TX, which causes transfer transistor 215 to transfer the charge accumulated in photodiode 210 to floating diffusion (FD) node 217. Floating diffusion 217 is in effect the drain of the transfer transistor while the photodiode is the source of transfer transistor 215. In one embodiment transfer transistor is a metal-oxide semiconductor field-effect transistor (MOSFET). Reset transistor 220 is coupled between power rail VDD and floating diffusion node 217 to reset sensor pixel 200 (e.g., discharge or charge floating diffusion node 217 and photodiode 210 to a preset voltage) in response to a reset signal RST. Floating diffusion node 217 is coupled to control the gate terminal of source-follower transistor 225. Source-follower transistor 225 is coupled between power rail VDD and row select transistor 230 to amplify a signal responsive to the charge on the floating diffusion FD node 217. Row select transistor 230 couples the output of pixel circuitry from the source-follower transistor 225 to the readout column, or bit line 235, in response to a row select signal RS. Photodiode 210 and floating diffusion node 217 are reset by temporarily asserting or enabling the reset signal RST and transfer signal TX. The accumulation period or accumulating window (e.g., exposure period) begins when the transfer signal TX is disabled, which permits incident light to photo-generate charge in photodiode 210. As photo-generated electrons accumulate in photodiode 210, its voltage decreases (electrons are negative charge carriers). The voltage or charge on photodiode 210 is representative of the intensity of the light incident on photodiode 210 during the exposure period. At the end of the exposure period, the reset signal RST is disabled, which turns off the reset transistor 220 and isolates floating diffusion FD node 217 from VDD. The transfer signal TX is then enabled to couple photodiode 210 to floating diffusion node 217. The charge is transferred from photodiode 210 to the floating diffusion FD node 217 through transfer transistor 215, which causes the voltage of floating diffusion FD node 217 to drop by an amount proportional to photo-generated electrons accumulated on photodiode 210 during the exposure period. The accumulation period or exposure window actually ends when the transfer transistor is disabled since the photodiode is actually still accumulating charge while the transfer transistor is enabled and transferring charge to the floating diffusion.

An important design metric in image sensors is dynamic range, which is defined as the logarithmic ratio between the largest non-saturating photocurrent and the smallest detectable photocurrent. For a sensor with a fixed saturation charge, also referred to as well capacity, saturation limits the highest signal. Generally, the smallest detectable photocurrent is dominated by reset sampling noise of the photodiode and the floating diffusion. Efforts to reduce the impact of reset sampling noise on dynamic range have relied on correlated double sampling (CDS). CDS is a technique of taking two samples of a signal out of the pixel and subtracting the first from the second to remove reset sampling noise. Generally, the sampling is performed once immediately following reset of the photodiode and floating diffusion and once after the photodiode has been allowed to accumulate charge and transfer it to the floating diffusion. The subtraction is typically performed in peripheral circuitry outside of the pixel and may increase conventional image sensor area although it may not increase pixel area. An image sensor utilizing a rolling shutter readout mode may incorporate CDS with only added peripheral circuit elements and no additional circuit elements in the pixel. An image sensor utilizing global shutter however may require multiple capacitors and transistors inside the pixel which decreases the fill factor. It is advantageous to maintain reduced fill factor by partitioning the additional components required for CDS on to a circuit chip separate from and stacked on top of a sensor chip.

Figure 3:
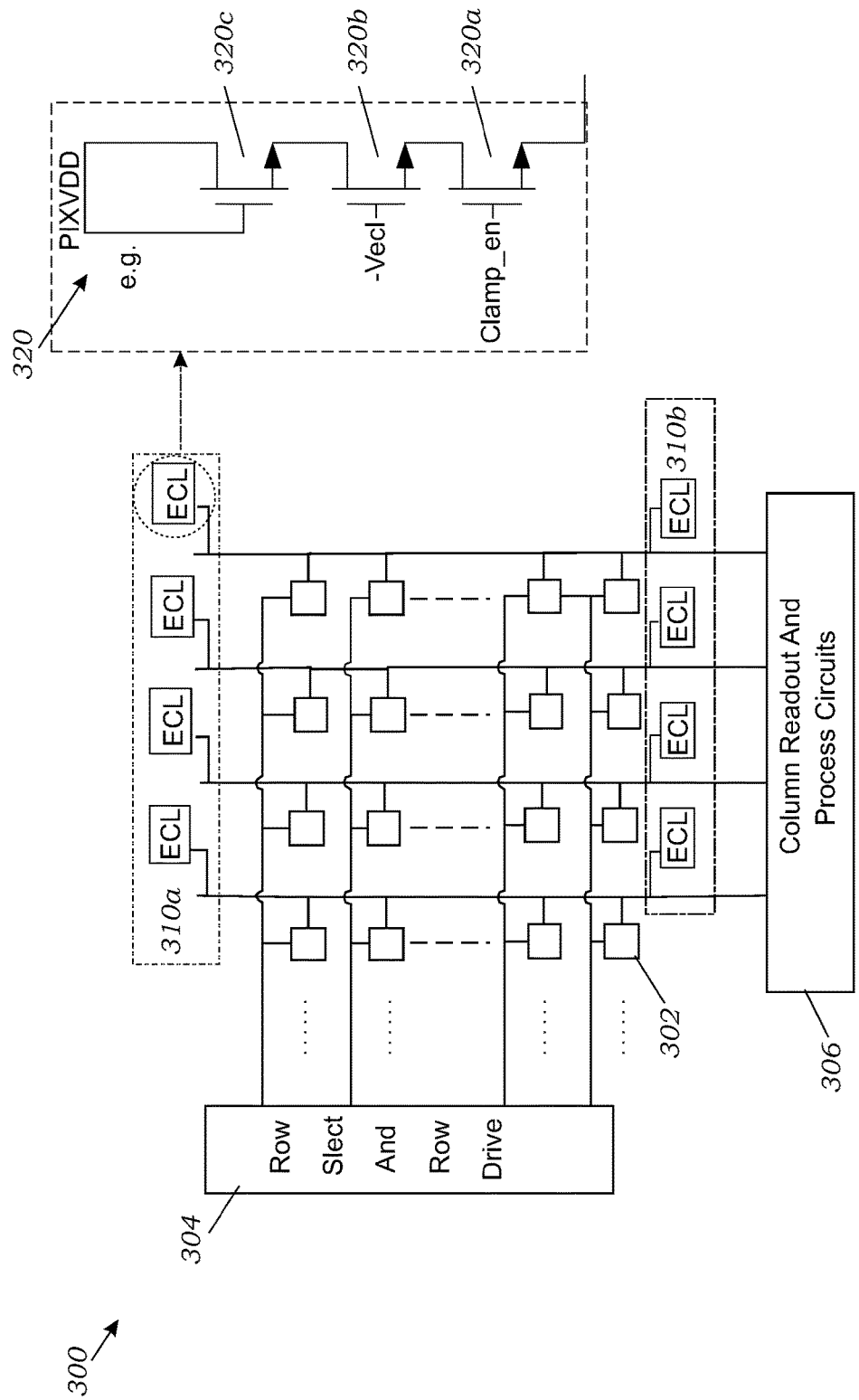
FIG. 3 is a diagram illustrating a pixel cell layout and readout and control circuits according to one embodiment of the present invention.

FIG. 3 is a diagram illustrating a pixel cell array 300 including pixels 302 arranged in rows and columns. Row select and row driver circuits 304 provide control to the rows and column readout and process circuits 306 provide image signal readout to the columns. As pixel cell miniaturization proceeds larger and larger arrays become feasible to manufacture with one side effect being that column lines may have smaller width to prevent the overall size of the array from growing. Smaller column line widths result in higher line resistance which in pixel arrays with a single anti-eclipse circuit may require longer settling time to establish an anti-eclipse clamp voltage and may result in vertical shading. FIG. 3 illustrates one embodiment of the invention wherein two rows of anti-eclipse circuits 310a and 310b are included in the column readout circuit to help reduce the settling time of the anti-eclipse voltage as well as reduce the opportunity for vertical shading to occur.

FIG. 3 illustrates one example of anti-eclipse circuits 310a and 310b in diagram 320. Clamp circuit 320 consists of three transistors in series between voltage PIXVDD and one end of the column line. Clamp enable transistor 320a turns on the clamp circuit when needed and transistor 320b sets the level of the clamp voltage. Transistor 302c is in a diode-connected transistor configuration which is included for its diode properties.

In summary, as a result of the described circuit diagram of FIG. 3 a clamp voltage is provided to the columns of pixel array 300 from both their top and bottom which will reduce clamp voltage setting time and increase the uniformity by which the clamp is provided to pixels along the columns as well as from the first column to the last and thereby reduce vertical shading in a resultant image.

Reference throughout this specification to "one embodiment," "an embodiment," "one example," or "an example" means that a particular feature, structure, or characteristic described in connection with the embodiment or example is included in at least one embodiment or example of the present invention. Thus, the appearances of the phrases such as "in one embodiment" or "in one example" in various places throughout this specification are not necessarily all referring to the same embodiment or example. Furthermore, the particular features, structures, or characteristics may be combined in any suitable manner in one or more embodiments or examples. Directional terminology such as "top," "down," "above," "below" are used with reference to the orientation of the figure(s) being described. Also, the terms "have," "include," "contain," and similar terms are defined to mean "comprising" unless specifically stated otherwise. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

The above description of illustrated examples of the present invention, including what is described in the Abstract, are not intended to be exhaustive or to be limited to the precise forms disclosed. While specific embodiments of, and examples for, the invention are described herein for illustrative purposes, various equivalent modifications are possible without departing from the broader spirit and scope of the present invention. Indeed, it is appreciated that the specific example structures and materials are provided for explanation purposes and that other structures and materials may also be employed in other embodiments and examples in accordance with the teachings of the present invention. These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation.

What is claimed is:

1. In an imaging array having a plurality of pixel sensor cells arranged in a plurality of rows and columns, pixel data being read out on column lines of the array, two column line anti-eclipse voltage clamp circuits for column lines in the array comprising:
    a first anti-eclipse voltage clamp circuit coupled to the top of each of the columns of pixels, which forms a row at a top of the array;
    a second anti-eclipse voltage clamp circuit coupled to the bottom of each of the column of pixels, which forms a row at a bottom of the array;
    wherein the employment of the two anti-eclipse voltage clamp circuits reduces a settling time of the anti-eclipse clamp voltage which reduces a top to bottom or vertical shading of an image captured and read out from the imaging array; and
    wherein each anti-eclipse voltage clamp circuit comprises three MOS transistors coupled between a power supply and the column line comprising:
        a diode-connected transistor with its gate and drain connected to the power supply; and
        a variable clamp voltage level setting transistor with its drain connected to the source of the diode-connected transistor; and
        a clamp enable transistor with its drain connected to the source of the clamp voltage level setting transistor and it source connected to the column line.

2. The imaging array of claim 1, wherein the first and the second anti-eclipse voltage clamp circuits consist of at least two rows of anti-eclipse voltage clamp circuits respectively.

3. The imaging array of claim 1, wherein the MOS transistors are n-type metal oxide semiconductor (NMOS) transistors.

4. The imaging array of claim 1, wherein the two anti-eclipse voltage clamp circuits are connected to the same power supply.

5. The imaging array of claim 4, wherein the two anti-eclipse voltage clamp circuits are connected to the same power supply at both ends of the rows.

* * * * *